United States Patent [19]

Biggs et al.

[11] 4,436,774

[45] Mar. 13, 1984

[54] RUBBER/POLYMERIC MATERIAL COMPOSITES

[75] Inventors: Ian Biggs, Sutton Coldfield; Ronald S. Goy, Staffordshire, both of England

[73] Assignee: Dunlop Limited, London, England

[21] Appl. No.: 390,709

[22] Filed: Jun. 21, 1982

Related U.S. Application Data

[63] Continuation of Ser. No. 941,249, Sep. 11, 1978, abandoned.

[30] Foreign Application Priority Data

May 12, 1978 [GB] United Kingdom ............... 19167/78

[51] Int. Cl.$^3$ ........................... B05D 3/02; B29H 5/02; B29H 5/10
[52] U.S. Cl. ....................................... 427/40; 156/333; 156/334; 156/910; 427/54.1; 427/393.5
[58] Field of Search .................. 156/110 A, 244, 333, 156/334; 427/393.5; 428/518, 520

[56] References Cited

U.S. PATENT DOCUMENTS 3,024,813  3/1962  Sear et al. ........................ 156/110 A
3,506,512  4/1970  Guy ................................. 156/110 A
3,532,592  10/1970 Kraus et al. ..................... 428/520 X
3,580,800  5/1971  Torti et al. ....................... 156/110 A

FOREIGN PATENT DOCUMENTS 458904   12/1936  United Kingdom .
702928   1/1954   United Kingdom .
1293842  10/1972  United Kingdom .
1295677  11/1972  United Kingdom .
1305772  2/1973   United Kingdom .
1317943  5/1973   United Kingdom .
1352645  5/1974   United Kingdom .
1404732  9/1975   United Kingdom .
1422256  1/1976   United Kingdom .
1462717  1/1977   United Kingdom .
1485618  9/1977   United Kingdom .

Primary Examiner—Michael R. Lusignan
Attorney, Agent, or Firm—Stevens, Davis, Miller & Mosher

[57] ABSTRACT

A method of making a composite, e.g. a hose comprises (i) applying a treatment agent to the surface of a vulcanizable rubber composition, then (ii) vulcanizing the rubber composition and then (iii) solidifying a polymeric material e.g. a vinyl chloride polymer in contact with the vulcanized treated rubber composition.

48 Claims, No Drawings

RUBBER/POLYMERIC MATERIAL COMPOSITES

This is a continuation of application Ser. No. 941,249 filed Sept. 11, 1978, now abandoned.

This invention relates to a method of making a composite of a vulcanised rubber and a polymeric material.

According to the present invention, a method of making a composite comprises (i) applying a treatment agent as hereinafter defined to the surface of a vulcanisable rubber composition, then (ii) vulcanising the rubber composition and then (iii) solidifying a polymeric material in contact with the vulcanised treated rubber composition.

The treatment agent will halogenate and/or oxidise the rubber surface and is preferably either a chemical reagent (e.g. a strong oxidising agent or a halogen donor) or irradiation such as U V or Corona discharge. Suitable examples of chemical reagents include trichloroisocyanuric acid (available as Fi-clor 91 from Fisons), sodium dichloroisocyanurate (available as Fi-clor 60s from Fisons), alkyl hypohalites (e.g. butyl hypochlorite), acidified inorganic hypohalites (e.g. acidified sodium hypochlorite), sodium chlorite and peracetic acid. Preferably the treatment agent when a chemical reagent is applied non-aqueously, e.g. as a solution in an organic solvent such as ethyl acetate or acetone, by any conventional means, for example by dipping, spraying or brushing.

Preferably the vulcanisable rubber composition is based upon an unsaturated rubber containing in excess of 5 unsaturated bonds for every 100 main chain carbon atoms and more preferably in excess of 15 unsaturated bonds for every 100 main chain carbon atoms. Preferably the rubber composition is based upon a non-polar rubber and suitable examples include natural rubber, styrene/butadiene, polychloroprene and blends of any of these. The rubber composition may contain conventional additives (e.g. fillers) or processing agents. It is to be understood that the rubber composition is in the vulcanised state, i.e. cross-linked, elastomeric, non-thermoplastic state, prior to contact with the solidifiable polymeric material.

The rubber composition may be vulcanised by any sulphur or non-sulphur conventional method. The method of the present invention may be particularly applicable when the rubber composition is vulcanised by means of a fluidised bed because the pre-treatment of the rubber composition may serve to detackify its surface, thus substantially preventing particles of the fluidised bed adhering to it.

The polymeric material may be applied e.g. as a solution, a dispersion (e.g. in a plasticiser), a latex or as two liquid components which react to form a solid polymer. Preferably the polymeric material is applied to the rubber composition and then heated to such a temperature that on cooling it will solidify. If desired, a further coating of the polymeric material may be applied after solidification of the first.

The polymeric material preferably contains at least one type of polar group e.g. selected from —Cl, —NH$_2$, —C=O, —C≡N,

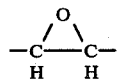

and —OH, and preferably has a solubility parameter of greater than 9 (cals/cc)$^{\frac{1}{2}}$, more preferably greater than 9.5 (cals/cc)$^{\frac{1}{2}}$. Solubility parameter is referred to on Page 834 of Volume 3 of the Encyclopaedia of Polymer Science and Technology—John Wiley and Sons. By "solubility parameter" is meant the square root of the cohesive energy density and indicates the magnitude of intermolecular forces within the polymer. Examples of suitable materials include a vinyl chloride polymer e.g. in plastisol form, an aliphatic polyamide, a polyurethane, a poly(vinyl acetate), an ethylene/vinyl acetate copolymer and a rubber which may be in latex form e.g. nitrile rubber or carboxylated nitrile rubber. It is to be understood that the term "vinyl chloride polymer" embraces poly(vinyl chloride) and copolymers of vinyl chloride with one or more other monomers. Suitable other monomers are e.g. vinyl esters and alkyl acrylates. Copolymers should preferably have a vinyl chloride content of at least 50 weight percent. Examples of suitable copolymers include copolymers of vinyl chloride with vinyl acetate or methyl acrylate, with or without a further monomer.

Preferably the polymeric material includes ingredients which will form a resin such as condensed aldehyde resin. Examples of suitable aldehyde condensation resin-forming ingredients are an aromatic hydroxy compound, especially one having two hydroxyl groups meta to each other such as resorcinol, phloroglucinol or 1,3-dihydroxynaphthalene, and a compound which liberates methylene groups on being heated such as hexamethylene tetramine, hexamethoxymethyl melamine, lauryloxymethyl pyridinium chloride, cetyloxymethyl pyridinium chloride, ethyloxymethyl pyridinium chloride or a polymer of formaldehyde. Alternatively a partially or fully condensed resin such as a condensed aldehyde resin may be included in the polymeric material and examples of these are melamine and urea-formaldehyde resins.

When resin-forming ingredients or a partially or fully condensed resin is included in the polymeric material it may be desirable to include also an epoxy resin or an isocyanate in the polymeric material. This extra ingredient may reduce the potential porosity of the polymeric material.

The resin-forming ingredients or partially condensed resin or fully condensed resin is/are preferably present in a total amount in the range of from 3.2 to 12 parts by weight based on 100 parts dry weight of the polymeric material. If resin forming ingredients are used such as an aromatic hydroxy compound and a compound which liberates methylene groups on heating these are preferably present in an amount in the range of from 2 to 7.5 parts by weight and 1.2 to 4.5 parts by weight respectively based on 100 parts by dry weight of the polymeric material.

In a preferred embodiment of the present invention a liquid polymeric material is heated and then solidified in contact with a vulcanised rubber composition.

The polymeric material and/or rubber composition may be reinforced by a woven or non-woven textile e.g. in strip, cord, yarn, strand or filament form. Suitable examples of textile materials include rayon, polyester, aromatic polyamide or nylon, or glass or a metal such as steel. For example the polymeric material may be applied to the vulcanised rubber composition and then reinforcing members may be applied to the polymeric material. Alternatively, reinforcing members may be dipped in the polymeric material and then applied to the vulcanised rubber composition which has been pretreated according to the present invention.

If desired the polymeric material (A) may be bonded to another polymeric material (B) e.g. a polyurethane, by solidifying the former material (A) in contact with the vulcanised rubber composition and then applying molten polymeric material (B) to the polymeric material/vulcanised rubber composite.

The method of the present invention may be useful in the manufacture of reinforced tubular articles such as hose. For example, an inner tube of a vulcanisable rubber composition can be bonded to a solidifiable polymeric material containing an assembly of reinforcing members by the method of the present invention. If desired a molten cover layer of polymeric material may be applied to the vulcanised rubber/reinforced polymeric material after solidification of the latter. If desired, the reinforced polymeric material may be treated with a solvent e.g. cyclohexanone or methyl ethyl ketone before application of the cover.

The method of the present invention will now be illustrated in the following Examples in which all parts are by weight:

EXAMPLE I

An SBR rubber composition of formulation A was heated to 100° C., coated with a 1% solution of trichloroisocyanuric acid (Fi-clor 91) in acetone and the solvent allowed to evaporate. The treatment time was about 1 second. The treated rubber composition was then vulcanised for 80 seconds in a fluid bed at 220° C. and then coated with a poly(vinyl chloride) plastisol of formulation B. An infra red oven was used to heat the poly(vinyl chloride) coating to 170° C. and on cooling it solidified. The following peel test results (B S 903 part A12) were obtained:

No treatment of rubber: 0.15 K.N/m
Fi-clor treated rubber: 1.85 K.N/m

|  | Parts |
|---|---|
| Formulation A | |
| Intol 1712 (SBR) | 100 |
| Zinc oxide | 3 |
| Stearic acid | 1 |
| Flectol flakes (antioxidant) | 1 |
| Vulcan M (carbon black) | 40 |
| Sterling 105 (carbon black) | 45 |
| China clay | 125 |
| Process oil | 20 |
| Caloxal W. (dispersion of calcium oxide in wax and process oil) | 20 |
| Sulphur | 2.5 |
| Mercaptobenzthiazole (MBT) | 2 |
| Diphenyl guanidine (DPG) | 0.2 |
| Formulation B | |
| Breon 130/1 | 100 |
| Dialphanol phthalate | 60 |
| Lead carbonate | 5 |
| Resorcinol | 7.5 |
| Hexamethylene tetramine | 4.5 |

EXAMPLE II

The procedure of Example I was repeated except that the sulphur, MET and DPG were replaced by 3.5 parts tetramethyl thiuram disulphide and 1 part zinc dithiocarbamate. Using the B S 903 part A12 peel test the result was 2.1 K.N/m.

EXAMPLE III

A hose was made as follows. A rubber composition having the formulation A of Example I was extruded from a tubing extruder with a 2.5 mm tube wall thickness and a 25 mm internal diameter. 90 mm from the extruder die a curtain coater was used to apply a 1% solution of Fi-clor 91 in acetone. The tube was passed continuously into a fluid bed at 220° C. and the time in the bed was 80 seconds. On leaving the bed, a 0.25 mm layer of a PVC plastisol having the formulation B of Example I was applied to the hot tube which was passed through an infra red oven for 36 seconds. A further 0.25 mm coating of the plastisol was then applied and two opposed spiral layers each of 12 cords of 3 fold 94 tex nylon yarn were wrapped around the tube. The tube was then heated for 4 minutes in an infra red oven during which time the plastisol coating attained a temperature of 170° C. The tube was then passed through the crosshead of an extruder and before its surface temperature had cooled below 150° C., a 2.5 mm covering layer of a plasticised poly(vinyl chloride) composition (general purpose extrusion grade—WELVICK Gp/113 from I.C.I.) was extruded around it. Peel test results (B S 903 part A12) were as follows:

|  | K.N/m |
|---|---|
| Rubber/reinforced layer | 2.4 |
| Reinforced layer/cover layer | 3.1 |

Having now described our invention, what we claim is:

1. A method of making a composite by bonding a rubber to a polymeric material comprising the steps of (i) applying to a vulcanisable rubber composition a treatment agent which will halogenate and/or oxidise the rubber surface, (ii) vulcanising the rubber composition by means of a fluidised bed (iii) contacting the vulcanised treated rubber composition with a polymeric material and (iv) causing or allowing the polymeric material to solidify in contact with the rubber composition to form the composite.

2. A method according to claim 1 wherein the treatment agent is a chemical reagent.

3. A method according to claim 2 wherein the chemical reagent is selected from the group consisting of trichloroisocyanuric acid, sodium dichloroisocyanurate, an alkyl hypohalite, an acidified inorganic hypohalite, sodium chlorite and peracetic acid.

4. A method according to claim 3 wherein the chemical reagent is selected from the group consisting of butyl hypochlorite and acidified sodium hypochlorite.

5. A method according to claim 2 wherein the treatment agent is applied non-aqueously.

6. A method according to claim 5 wherein the treatment agent is applied in an organic solvent.

7. A method according to claim 1 wherein the treatment agent is selected from the group consisting of U.V. and corona discharge.

8. A method according to claim 1 wherein the vulcanisable rubber composition is based upon an unsaturated rubber containing in excess of 5 unsaturated bonds for every 100 main chain carbon atoms.

9. A method according to claim 1 wherein the vulcanisable rubber composition is based upon an unsaturated rubber containing in excess of 15 unsaturated bonds for every 100 main chain carbon atoms.

10. A method according to claim 1 wherein the rubber composition is based upon a non-polar rubber.

11. A method according to claim 10 wherein the rubber composition is based upon a rubber selected from the group consisting of natural rubber, styrene/-butadiene rubber, polychloroprene rubber and blends of any of these.

12. A method according to claim 1 wherein a further polymeric material is applied to the solidifed polymeric material-coated rubber composition.

13. A method according to claim 1 wherein the polymeric material is applied to the vulcanised rubber composition as a solution or dispersion.

14. A method according to claim 13 wherein the polymeric material is applied as a plastisol.

15. A method according to claim 1 wherein the polymeric material is applied as a latex.

16. A method according to claim 1 wherein the polymeric material is heated and then cooled in contact with the vulcanised rubber composition.

17. A method according to claim 1 wherein the polymeric material contains at least one type of polar group selected from the group consisting of —Cl, —NH$_2$, —C=O, —C≡N,

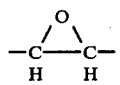

and —OH.

18. A method according to claim 1 wherein the polymeric material has a solubility parameter of greater than 9 (cals/cc)$^{\frac{1}{2}}$.

19. A method according to claim 1 wherein the polymeric material has a solubility parameter of greater than 9.5 (cals/cc)$^{\frac{1}{2}}$.

20. A method according to claim 1 wherein the polymeric material is a vinyl chloride polymer.

21. A method according to claim 20 wherein the polymeric material is poly(vinyl chloride).

22. A method according to claim 20 wherein the polymeric material is a copolymer of vinyl chloride with at least one other monomer.

23. A method according to claim 22 wherein the copolymer has a vinyl chloride content of at least 50 weight percent.

24. A method according to claim 22 wherein the polymeric material is a copolymer of vinyl chloride with at least one monomer selected from vinyl esters and alkyl acrylates.

25. A method according to claim 24 wherein the polymeric material is a copolymer of vinyl chloride with vinyl acetate or methyl acrylate, with or without a further monomer.

26. A method according to claim 1 wherein the polymeric material is a rubber.

27. A method according to claim 26 wherein the polymeric material is nitrile rubber or carboxylated nitrile rubber.

28. A method according to claim 1 wherein the polymeric material is a polyurethane.

29. A method according to claim 1 wherein the polymeric material is poly(vinyl acetate) or an ethylene/vinyl acetate copolymer.

30. A method according to claim 1 wherein the polymeric material is an aliphatic polyamide.

31. A method according to claim 1 wherein the polymeric material includes ingredients which will form a resin.

32. A method according to claim 1 wherein the polymeric material includes ingredients which will form a condensed aldehyde resin.

33. A method according to claim 32 wherein the ingredients comprise an aromatic hydroxy compound and a compound which liberates methylene groups on being heated.

34. A method according to claim 33 wherein the aromatic hydroxy compound has two hydroxyl groups meta to each other.

35. A method according to claim 34 wherein the aromatic hydroxy compound is selected from the group consisting of resorcinol, phloroglucinol and 1,3-dihydroxynaphthalene.

36. A method according to claim 33 wherein the compound which liberates methylene groups is selected from the group consisting of hexamethylene tetramine, hexamethoxymethyl melamine, lauryloxymethyl pyridinium chloride, cetyloxymethyl pyridinium chloride, ethyloxy methyl pyridinium chloride and a polymer of formaldehyde.

37. A method according to claim 32 wherein the total weight of the ingredients which will form a condensed aldehyde resin is from 3.2 to 12 parts based on 100 parts dry weight of the polymeric material.

38. A method according to claim 33 wherein the amount of aromatic hydroxy compound and a compound which liberates methylene groups is in the range 2 to 7.5 parts by weight and 1.2 to 4.5 parts by weight respectively based on 100 parts dry weight of the polymeric material.

39. A method according to claim 1 wherein the polymeric material includes a partially or fully condensed resin.

40. A method according to claim 31 wherein the polymeric material includes an epoxy resin or an isocyanate.

41. A method according to claim 39 wherein the polymeric material includes a partially or fully condensed aldehyde condensation resin.

42. A method according to claim 39 wherein the polymeric material includes a partially or fully condensed melamine or urea-formaldehyde resin.

43. A method according to claim 39, wherein the amount of partially or fully condensed resin is in the range of from 3.2 to 12 parts by weight based on 100 parts dry weight of the polymeric material.

44. A method according to claim 1 wherein the polymeric material is reinforced by a woven or non-woven textile.

45. A method according to claim 1 wherein the rubber composition is reinforced by a woven or non-woven textile.

46. A method according to claim 44 wherein the textile is selected from the group consisting of rayon, polyester, aromatic polyamide, nylon, glass or metal.

47. A method according to claim 45 wherein the textile is selected from the group consisting of rayon, polyester, aromatic polyamide, nylon, glass or metal.

48. A method according to claim 39 wherein the polymeric material also includes an epoxy resin or an isocyanate.

* * * * *